(12) United States Patent
Signorini et al.

(10) Patent No.: US 10,659,473 B2
(45) Date of Patent: May 19, 2020

(54) METHOD AND APPARATUS FOR BLOCKCHAIN POWERED INTEGRITY PROTECTION SYSTEM

(71) Applicant: NOKIA SOLUTIONS AND NETWORKS OY, Espoo (FI)

(72) Inventors: Matteo Signorini, Palaiseau (FR); Matteo Pontecorvi, Palaiseau (FR); Jan Kok, Munich (DE); Scott Lively, Bartlett, IL (US); Maurice Godin, Nepean (CA)

(73) Assignee: Nokia Solutions And Networks Oy, Espoo (FI)

( * ) Notice: Subject to any disclaimer, the term of this patent is extended or adjusted under 35 U.S.C. 154(b) by 246 days.

(21) Appl. No.: 15/808,723

(22) Filed: Nov. 9, 2017

(65) Prior Publication Data

US 2019/0141054 A1 May 9, 2019

(51) Int. Cl.
*H04L 29/06* (2006.01)
*G06F 21/64* (2013.01)
*G06F 8/65* (2018.01)
*H04W 12/10* (2009.01)
*H04L 9/32* (2006.01)

(52) U.S. Cl.
CPC .............. *H04L 63/123* (2013.01); *G06F 8/65* (2013.01); *G06F 21/64* (2013.01); *G06F 21/645* (2013.01); *H04L 9/3239* (2013.01); *H04W 12/1006* (2019.01); *H04L 2209/38* (2013.01)

(58) Field of Classification Search
CPC ..... H04L 63/12; H04L 63/123; H04L 9/3239; H04L 2209/38; G06F 21/64; G06F 21/645; G06F 8/65; G06F 8/658; H04W 12/10; H04W 12/1006
See application file for complete search history.

(56) References Cited

U.S. PATENT DOCUMENTS

| | | | | |
|---|---|---|---|---|
| 2012/0246131 A1* | 9/2012 | Semerdzhiev | .......... | G06F 16/10 707/695 |
| 2013/0326494 A1* | 12/2013 | Nunez | ................... | H04L 41/082 717/172 |
| 2015/0178063 A1* | 6/2015 | Narkinsky | .............. | G06F 8/658 717/168 |

(Continued)

OTHER PUBLICATIONS

Deshpande, "Learn how to blockchain guarantees data integrity for the Internet of Things", retrieved from the internet at http://cloudblog.ericsson.com/digital-services/blockchain-security-data-integrity-iot, 10 pages.

(Continued)

*Primary Examiner* — Eric W Shepperd
(74) *Attorney, Agent, or Firm* — Kramer Amado P.C.

(57) ABSTRACT

Various embodiments relate to a method and apparatus for using blockchains as an integrity tracking tool for network elements, the method including the steps of receiving, by a blockchain network, a patch request from a patch initiator, validating, by the blockchain network, the patch request and writing the patch request on the blockchain, transmitting, by the blockchain network, the patch request to a network element, receiving, by the blockchain network, a patch report from the network element, and validating, by the blockchain network, the patch report and writing the patch report on the blockchain.

29 Claims, 5 Drawing Sheets

(56) References Cited

U.S. PATENT DOCUMENTS

| | | | |
|---|---|---|---|
| 2016/0070556 A1* | 3/2016 | Baset | H04L 67/10 |
| | | | 717/168 |
| 2016/0261690 A1* | 9/2016 | Ford | H04L 67/1044 |
| 2016/0337169 A1* | 11/2016 | Chhabra | H04L 41/0672 |
| 2017/0031676 A1* | 2/2017 | Cecchetti | G06F 8/65 |
| 2018/0088928 A1* | 3/2018 | Smith | H04L 67/34 |
| 2018/0096042 A1* | 4/2018 | Kuzma | H04L 9/3236 |
| 2018/0157481 A1* | 6/2018 | Zessin | H04L 63/00 |
| 2018/0167217 A1* | 6/2018 | Brady | G06F 8/65 |
| 2018/0176229 A1* | 6/2018 | Bathen | G06F 8/65 |
| 2018/0183606 A1* | 6/2018 | High | G06F 21/64 |
| 2018/0293363 A1* | 10/2018 | Asati | G06F 21/64 |
| 2018/0337769 A1* | 11/2018 | Gleichauf | H04L 9/3239 |
| 2019/0004789 A1* | 1/2019 | Mills | G06F 8/70 |
| 2019/0266312 A1* | 8/2019 | Mintz | H04L 9/3236 |

OTHER PUBLICATIONS

European Search Report for EP 189201707.9-1213 dated Mar. 21, 2019.

Boudgugia, et al., "Towards Better Availability and Accountability for IoT Updates by Means of a Blockchain", 2017 IEEE European Symposium on Secuirty and Privacy Workshops, Apr. 27, 2017, pp. 50-58.

Seewald, "Blockchain-Based Confirmation of Endpoint State in Networks", IP Com Journal, ip.com Inc., West Henrietta, NY US Apr. 18, 2017.

* cited by examiner

METHOD AND APPARATUS FOR BLOCKCHAIN POWERED INTEGRITY PROTECTION SYSTEM

TECHNICAL FIELD

This disclosure relates generally to a tool for security risk management and compliance, and more specifically, but not exclusively, to using blockchains in an integrity tracking tool for network elements.

BACKGROUND

By way of a brief background, network security officers who monitor networks must know and be able to track their Internet of Things ("IoT") networks and devices connected to their networks. The integrity of each of these devices is a critical element to security risk management and compliance and ensures a secure network.

These devices, or infrastructure/network elements, are subject to constant change due to upgrades and/or updates/patches and malicious manipulation (e.g. cyberattacks or advanced persistent threats).

Therefore, these network security officers must have access to real time status information regarding their IoT network's integrity, which enables them to detect an "event" that has occurred in the network element and, if necessary, revert back to last known functioning status of the network element when an error has occurred, in an efficient and reliable way.

The necessity for these actions will become increasingly more critical as more network elements are connected to more IoT and other networks.

Presently, there are alternatives that exist to provide network security officers with the above-described information and resources, however, these alternatives are deficient in several ways.

First, for example, classic intrusion detection systems require manual interaction by the network security officer, which may often be erroneous, unsecure, time consuming and costly.

Second, for another example, presently there exists host based intrusion detection systems, however, these host based intrusion detection systems are limited in function and do not utilize modern blockchain technology.

SUMMARY OF EXEMPLARY EMBODIMENTS

A brief summary of various embodiments is presented below. Embodiments address the need to create a method and apparatus for using blockchains in an integrity tracking tool for network elements.

In order to overcome these and other shortcomings of the prior art and in light of the present need to create a method and apparatus for using blockchains in an integrity tracking tool for network elements, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a method for using blockchains as an integrity tracking tool for network elements, the method including the steps of receiving, by a blockchain network, a patch request from a patch initiator, validating, by the blockchain network, the patch request and writing the patch request on the blockchain, transmitting, by the blockchain network, the patch request to a network element, receiving, by the blockchain network, a patch report from the network element and validating, by the blockchain network, the patch report and writing the patch report on the blockchain.

In an embodiment of the present disclosure, the method for using blockchains as an integrity tracking tool, further including transmitting, by the blockchain network, a previous status of a first instance of the software to be patched in the network element to an audit system.

In an embodiment of the present disclosure, a patch is transmitted from the patch initiator to the network element.

In an embodiment of the present disclosure, the network element compares the patch request from the blockchain network to the patch from the patch initiator.

In an embodiment of the present disclosure, a second instance of the software to be patched is created when the patch request from the blockchain network matches the patch from the patch initiator.

In an embodiment of the present disclosure, the second instance of the network element applies the patch and generates the patch report.

In an embodiment of the present disclosure, the second instance of the network element reports to a first instance of the software to be patched network element that the patch is safe.

In an embodiment of the present disclosure, the patch is applied to the first instance of the network element.

In an embodiment of the present disclosure, the audit system compares the previous status of the network element to a local current status of the network element.

In an embodiment of the present disclosure, a warning is transmitted to the patch initiator when the local current status of the network element does not match the previous status of the network element.

In an embodiment of the present disclosure, the patch request includes a hash value, which is calculated using patch dependencies and an expected result of the patch.

In an embodiment of the present disclosure, the patch dependencies include prior patches, which are required to be installed before the patch can be installed.

Various embodiments described herein relate to an integrity tracking tool for network elements using blockchains, the integrity tracking tool including a blockchain network, configured to receive, by a full node client, a patch request from a patch initiator, validate, by the full node client, the patch request, write, onto a blockchain, the patch request, transmit, by the full node client, the patch request to a network element, receive, by the full node client, a patch report from the network element, and validate, by the full node client, the patch report and write the patch report onto the blockchain.

In an embodiment of the present disclosure, the integrity tracking tool, further including the blockchain network, configured to transmit, by the full node client, a previous status of a first instance of the software to be patched in the network element to an audit system.

In an embodiment of the present disclosure, a patch is transmitted from a blockchain database and a lightweight client of the patch initiator to a lightweight agent of the first instance of the software to be patched in the network element.

In an embodiment of the present disclosure, the lightweight agent of first instance of the network element compares the patch request from the blockchain network to the patch from the blockchain database and lightweight client of the patch initiator.

In an embodiment of the present disclosure, a second instance of the software to be patched in the network element is created when the patch request from the blockchain network matches the patch from the blockchain database and lightweight client of the patch initiator.

In an embodiment of the present disclosure, the second instance of the network element applies the patch and generates the patch report.

In an embodiment of the present disclosure, the second instance of the network element reports to the lightweight agent of the first instance of the network element that the patch is safe.

In an embodiment of the present disclosure, the second instance of network element is deleted and the patch is applied to the lightweight agent of the first instance of the network element.

In an embodiment of the present disclosure, the audit system compares the previous status of the network element to a local current status of the network element.

In an embodiment of the present disclosure, a warning is transmitted to the lightweight client of the patch initiator when the local current status of the network element does not match the previous status of the network element.

In an embodiment of the present disclosure, the patch request includes a hash value, which is calculated using patch dependencies and an expected result of the patch.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

The IoT network includes network elements and each of these elements have statuses about changes to hardware versions, firmware versions, software versions and related configuration which will be computed and tracked using private blockchain technology in real-time. While IoT networks are used as an example herein, the embodiments described herein may also be applied to various types of other networks.

Distributed and encrypted databases (i.e. blockchain database), a consensus algorithm, and smart contracts will be applied to gain maximum security, scalability, and flexibility in the IoT network.

In the embodiment, network elements may be any portable communications devices such as smart telephones, a mobile radio, a cellular telephone, a smart watch, a tablet computer, personal digital assistant (PDA), or any other device connected to the network. In other networks, the network elements by include other types of devices.

A blockchain is known as a public or private ledger of all transactions that have occurred in the network. The blockchain dataset is always adding new blocks for each transaction. The new blocks are added to the blockchain database in a linear and chronological order.

As is known in blockchain technology, various network elements include a copy of the blockchain database so that the database is distributed and redundant.

Blockchain technology is well known and is used with the cryptocurrency Bitcoin.

Figure 1:
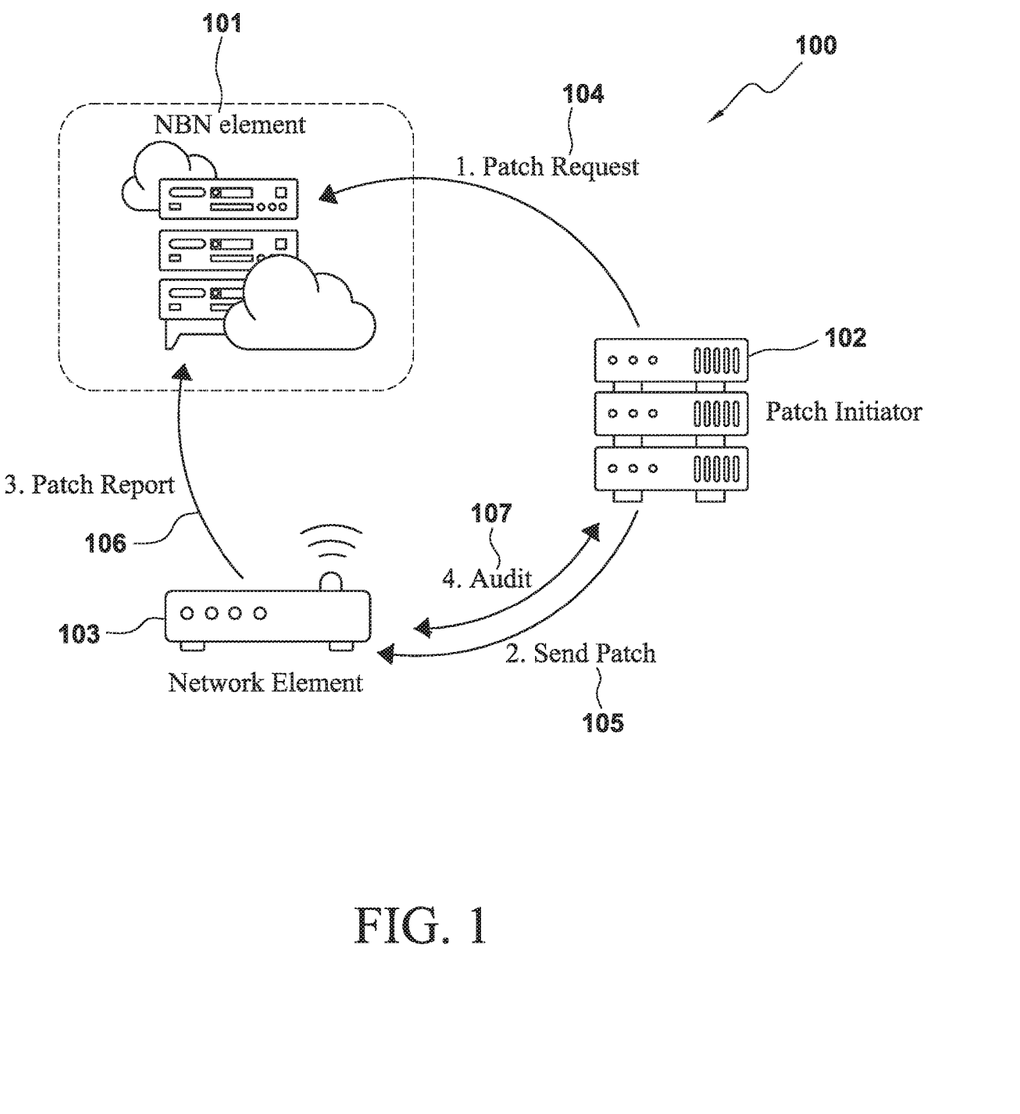
FIG. 1 illustrates a block diagram of an exemplary embodiment of the authenticated patch protocol.

FIG. 1 illustrates a block diagram of a network including a blockchain network 101.

In the embodiment, an overview of the authenticated patch protocol 100 includes a patch initiator ("PI") 102, a network element ("NE") 103 and a private blockchain network ("BN") 101. FIG. 1 illustrates single machines for the PI 102, NE 103, and BN 101; however, the PI 102, NE 103, and BN 101 may be scaled up to any number of machines.

FIG. 1 briefly summarizes the flow of information in the authenticated patch protocol 100.

A patch request 104 is sent from the PI 102 to the BN 101.

The patch 105 is then sent from the PI 102 to the NE 103.

Once the patch 105 has been applied, the result of the patch process, known as the patch report ("PRep") 106 is uploaded on the BN 101.

After the PRep is uploaded, an audit process 107, which is executed by either the PI 102 or an external element (not illustrated), may be executed to confirm that the patch 105 that was uploaded in the BN 101 is the patch that was installed on the NE 103.

Figure 2:
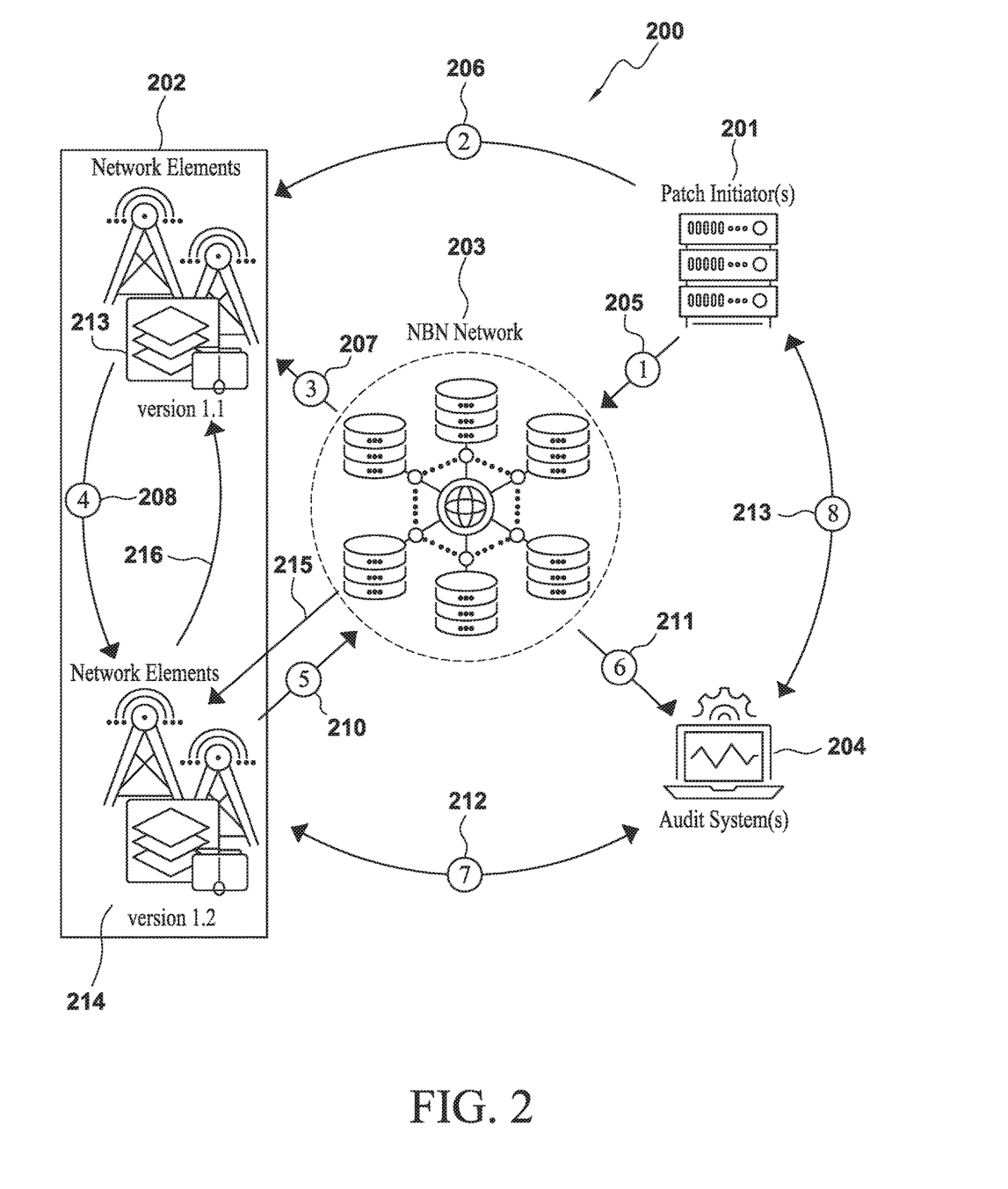
FIG. 2 illustrates a flow diagram of an exemplary embodiment of the flow of information in the authenticated patch protocol from FIG. 1.

FIG. 2 illustrates a more detailed flow diagram of the flow of information in the authenticated patch authenticated patch protocol from FIG. 1.

In the embodiment, the authenticated patch protocol 200 includes steps for the flow of information through a PI 201, a NE 202, a BN 203, and an audit system 204.

The network element 202 includes a first instance 213 and a second instance 214.

In step 205, the PI 201 sends a patch request ("PReq") to the BN 203. The PReq contains the expected result (i.e. all the changes applied to file systems, databases or any other data structure and system configuration) of a patch which has to be applied to one or more of the NE(s) 202 and 209. The BN 203 will validate the PReq and once it has been validated (i.e. it is verified that all the previous patches specified as prerequisites have already been written within the blockchain), it will be written within the blockchain database of the BN 203.

In step 206, after the PReq has been validated by BN 203 (i.e., it is visible and accessible within the blockchain database of the BN 203), the patch is sent by the PI 201 to the NE 202.

In step 207, the NE 202 confirms whether the patch received by the PI 201 is the one present in the blockchain database. If the received patch matches the patch which has been written in the blockchain of the BN 203, then in step 208, the NE 202, which includes a first instance 213 of software to be patched, may create a second instance 214 which is a replica of the first instance of the software to be patched and the second instance 214 begins the patch process on the second instance 214. This second instance 214 may be a new instantiation of the software to be patched.

The second instance 214 of the network element is created within the network element 202; however, for illustrative purposes in FIG. 2, thus the second instance is illustrated separately as NE 214. The second instance 214 computes the expected result of the patch application and creates a PRep.

In step 210, the PRep is sent to BN 203 for validation.

In step 215, the PRep is validated by the BN 203, written within the blockchain of the BN 203, and sent to the second instance 214. In step 216, the second instance 214 reports to the first instance 213 of the NE 202 that the patch is safe and may be processed by NE 202.

Once the patch is determined to be safe, the second instance 214 instantiation illustrated by NE 214 may be deleted, and the patch may be applied to NE 202.

Then, in step 211, the audit system 204 receives the last status of the NE(s) 202, as reported within the blockchain of the BN 203.

Specifically, in step 212, the audit system 204 queries the NE(s) 202 to determine their local current status and compares that current status to the one previously found in the blockchain of the BN 203.

If the status reported by the NE(s) 202 does not match the one present in the BN 203, in step 213, a warning may be reported to the PI 201 or to other network management systems.

Figure 3:
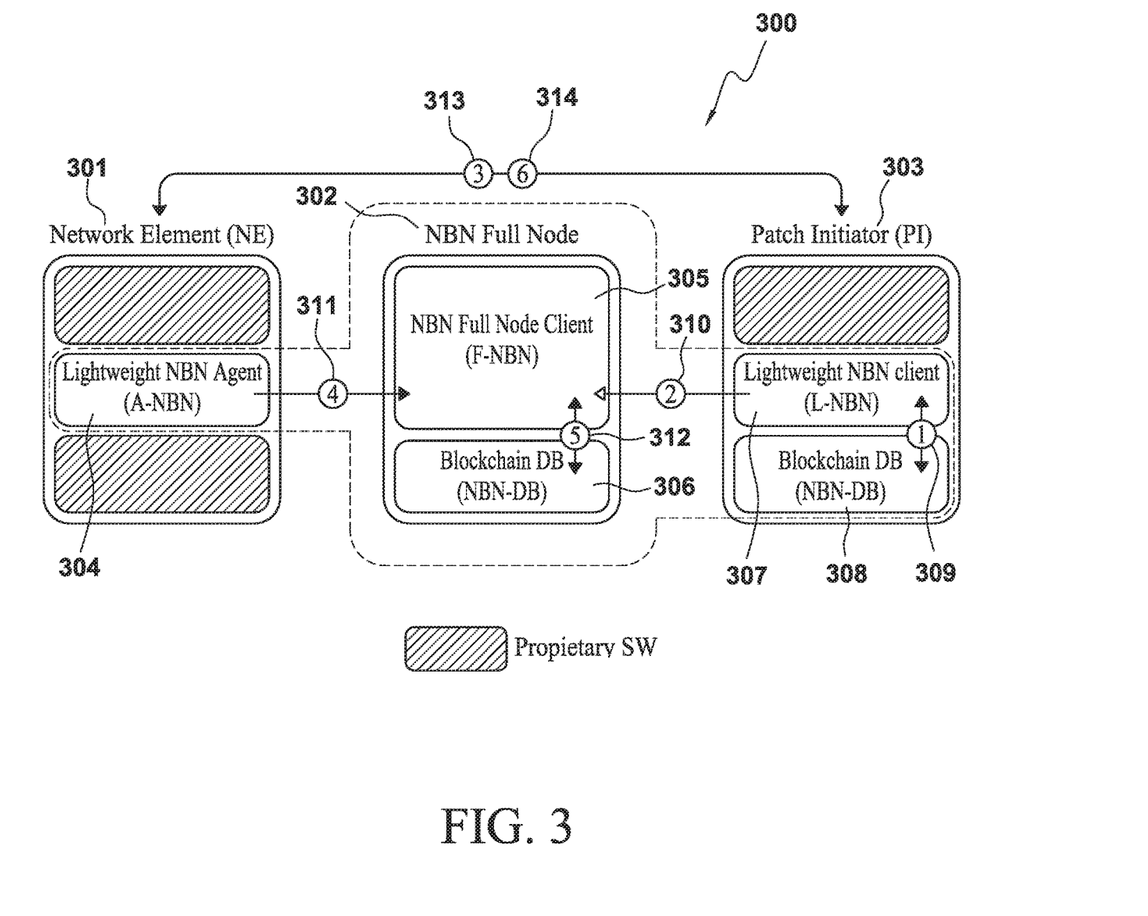
FIG. 3 illustrates a block diagram of an exemplary embodiment of the architecture of the authenticated patch protocol from FIG. 1.

FIG. 3 illustrates a block diagram of the architecture of the authenticated patch protocol 300 from FIG. 1 illustrating various software elements used to implement the authenticated patch protocol.

In the embodiment, FIG. 3 includes NE(s) 301, a BN Full Node 302 and a PI 303.

The NE(s) 301 includes a Lightweight BN Agent ("A-BN") 304. The BN Full Node 302 includes a BN Full Node Client ("F-BN") 305 and a Blockchain DB ("BN-DB") 306. The PI 303 includes a Lightweight BN Client ("L-BN") 307 and a Blockchain DB ("BN-DB") 308. In alternate embodiments, other agents and/or clients may be installed on both PI(s) 303 and NE(s) 301.

The PI 303 includes an L-BN 307 and its own local copy of the BN blockchain, referred to as BN-DB 308. The L-BN 307 is an interface, which interacts with the blockchain databases, specifically BN-DB 308. This control is necessary to determine if one or more NE(s) 301 satisfies the required dependencies.

As such, in step 309, once all the PReq and PRep, as discussed in FIG. 2, are received by the L-BN 307 client, a copy of the BN-DB 306 is stored locally within the BN-DB 308 when it is updated by the BN 302.

The L-BN 307 queries the BN-DB 308 to reduce the time needed to query the BN-DB 306 in the BN 302.

The BN-DB 308 may be excluded from the patch initiator 303.

When a new patch is requested or required, the L-BN 307 verifies which dependencies are necessary and once all the dependencies are found within the blockchain, the new patch request can be created and sent to the BN Full Node 302, which verifies the patch request, updates the BN-DB 306 based on the patch request and broadcasts the patch request in the blockchain network.

The F-BN 305 act as a miner in the blockchain network to ensure that both PReq messages and PRep messages are valid and that these validated messages are added to the blockchain DB. F-BN 305 receives messages from PI(s) 303 and NE(s) 301 and validates them by posting within the blockchain the current state of each NE 301.

F-BN 305 does not have access to the patch payload (i.e. the content of the patch, as it contains customer sensitive data); therefore, F-BN 305 receives hash values of both dependencies and the expected result.

These hash values are computed by both PI 303 (i.e. signed and written within PReq messages) and NE 301 (i.e. signed and written within PRep messages) while F-BN 305 determines whether they match.

In some embodiments, the PRep message and the PReq messages are new and are validated (by determining whether the hash values match) and if so, the PReq message is added to the BN-DB 306 followed by the PRep.

More specifically, when a PRep message is under validation (i.e. hash values are matched) the respective PReq message has been previously validated and is within the BN-DB 306. This validation step allows the NE 301 to determine if a patch request received from a PI 303 is valid.

PReq messages are sent from the PI 303 in step 310, and PRep messages are sent from the A-BN in step 311.

In step 312, the F-BN is updating the local blockchain data structures, which is BN-DB 306.

The A-BN 304 is required to create and sign PRep message transactions as well as communicate with BN 302. For example, in step 313, the patch payload may be sent from PI 303 to NE 301 and in step 314 the auditing process occurs.

During the auditing process, an audit system or an external entity, requires NE(s) 301 to provide their current system and configuration which is computed in the same way as performed during the patch process and if the system and configuration is the same as the current one recorded within the blockchain, then the NE 301 is assumed to be not compromised.

Figure 4:
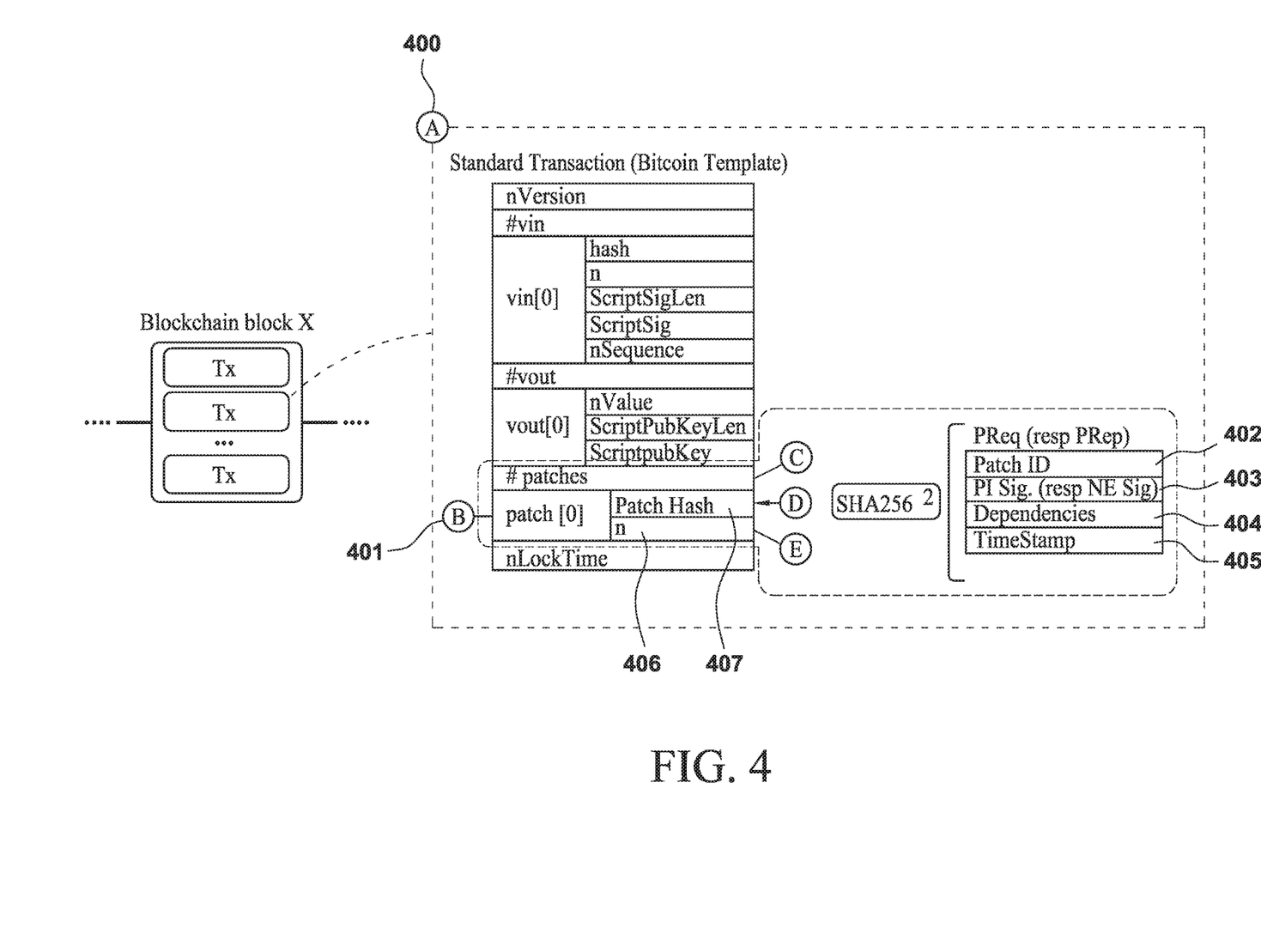
FIG. 4 illustrates a block diagram of an exemplary embodiment of the content of a blockchain block from FIG. 3.

FIG. 4 illustrates a block diagram of the content of a blockchain block 400 from FIG. 3.

In the embodiment, FIG. 4 illustrates how PReq messages and PRep messages may be embedded within a standard blockchain transactions such as that used for bitcoin. The blockchain block 400 includes standard input and output sections and a patch section 401, either for PReq or PRep.

A patch hash 407 includes the patch identifier 402 (i.e., an identifier to uniquely target a single patch), a patch identifier signature 403, a list of dependencies 404 which must be fulfilled for the patch report to be valid and a timestamp 405.

The patch section 401 may also include a patch release number (n). These transactions including the PRep messages and PReq messages may then be added to the blockchain data base (this needs a number in the FIG. 4) once they are validated.

Figure 5:
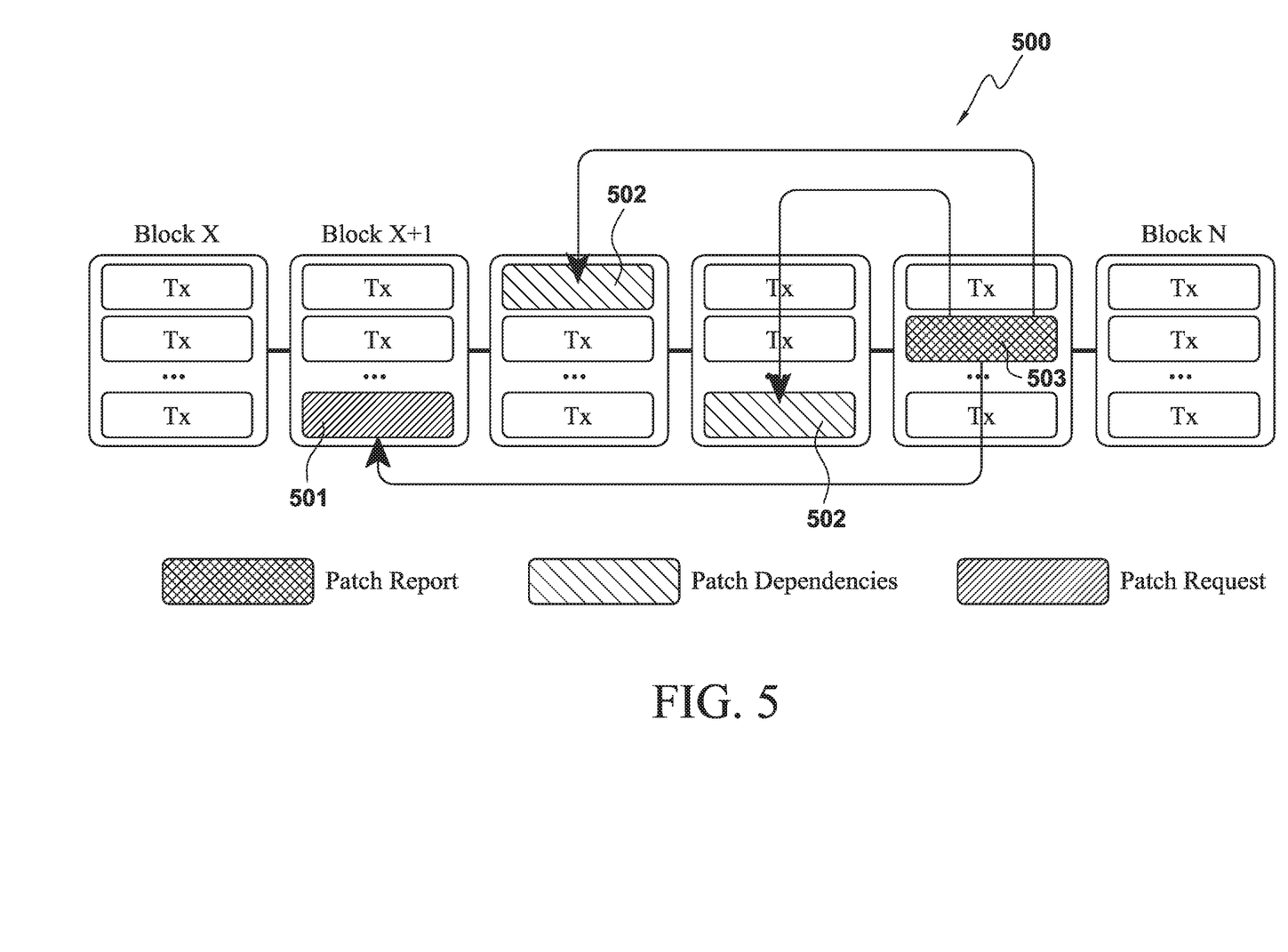
FIG. 5 illustrates a block diagram of an exemplary embodiment of the relationship between PReq and PRep.

FIG. 5 illustrates a block diagram 500 of the relationship between PReq 501 and PRep 503 and other dependencies in the blockchain.

In the embodiment, FIG. 5 illustrates how PReq 501 and PRep 503 messages are linked to each other within the blockchain.

The PReq 501 and PRep 503 messages must be linked in order for the F-BN in the BN to validate the messages then write them within new blocks. PReq message are validated before PRep messages and are linked to PReq messages.

Each PReq 501 and PRep 503 message pair must be linked and also may refer to other patch dependencies 502.

These patch dependencies 502 are previous PRep 503 messages which were used by NE(s) as a notification of previously installed patches that must be installed before the new patch is allowed to be installed.

To validate and apply a patch, a NE must validate that the patch dependencies 502 used by a new PRep 503 transaction are all the patch dependencies 502 that were initially specified within the PReq 501, that all of the patch dependencies 502 appear as valid transactions in the BN and that the patch outcome, as computed by the NE(s) is the same as computed by the PI(s).

The integrity tracking system described in the embodiments allows the system to detect integrity breaches immediately and reports will indicate to the operator of the network, vulnerabilities before an incident takes place.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes, which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for using blockchains as an integrity tracking tool for network elements, the method comprising:
   receiving, by a blockchain network, a patch request from a patch initiator, the patch request including first hashed information indicative of an expected result of a patch;
   validating, by the blockchain network, the patch request and writing the patch request on a blockchain;
   transmitting, by the blockchain network, the patch request to a network element;
   receiving, by the blockchain network, a patch report from the network element, the patch report including second hashed information indicative of the expected result of the patch applied to the network element;
   validating, by the blockchain network, the patch report in accordance with one or more operations, the one or more operations including confirming a match between the first hashed information and the second hashed information; and writing, by the blockchain network, the patch report on the blockchain.

2. The method for using blockchains as an integrity tracking tool of claim 1, further comprising: transmitting, by the blockchain network, a previous status of a first instance of a software to be patched in the network element to an audit system.

3. The method for using blockchains as an integrity tracking tool of claim 2, wherein a patch is transmitted from the patch initiator to the network element.

4. The method for using blockchains as an integrity tracking tool of claim 3, wherein the network element compares the patch request from the blockchain network to the patch from the patch initiator.

5. The method for using blockchains as an integrity tracking tool of claim 4, wherein a second instance of the software to be patched is created when the patch request from the blockchain network matches the patch from the patch initiator.

6. The method for using blockchains as an integrity tracking tool of claim 5, wherein the second instance of the network element applies the patch and generates the patch report.

7. The method for using blockchains as an integrity tracking tool of claim 6, wherein the second instance of the network element reports to a first instance of the software to be patched network element that the patch is safe.

8. The method for using blockchains as an integrity tracking tool of claim 7, wherein the patch is applied to the first instance of the network element.

9. The method for using blockchains as an integrity tracking tool of claim 8, wherein the audit system compares the previous status of the network element to a local current status of the network element.

10. The method for using blockchains as an integrity tracking tool of claim 9, wherein a warning is transmitted to the patch initiator when the local current status of the network element does not match the previous status of the network element.

11. The method for using blockchains as an integrity tracking tool of claim 1, wherein the first hashed information in the patch request is indicative of the expected result of the patch and one or more patch dependencies and wherein the second hashed information is indicative of the expected result of the patch and the one or more patch dependencies.

12. The method for using blockchains as an integrity tracking tool of claim 11, wherein the one or more patch dependencies include one or more prior patches installed in the network element, the blockchain including at least one block storing information indicative of the one or more prior patches.

13. The method for using blockchains as an integrity tracking tool of claim 1, wherein validating the patch request includes verifying that one or more previous patches specified as prerequisites have been written in a blockchain managed in the blockchain network.

14. The method for using blockchains as an integrity tracking tool of claim 1, further comprising:

writing a first block on the blockchain, the first block including information indicating the patch request, wherein writing the patch report includes writing a second block on the blockchain, the second block including information indicating the patch report; and linking the first block and the second block in the blockchain.

15. The method for using blockchains as an integrity tracking tool of claim 14, wherein the second block includes information linking the patch report in the second block to the patch request in the first block.

16. The method for using blockchains as an integrity tracking tool of claim 15, wherein at least one of the first block and the second block includes information linking the at least one of the first block and the second block to one or more patch dependencies.

17. The method for using blockchains as an integrity tracking tool of claim 16, wherein the blockchain includes a third block between the first block and the second block and wherein the third block includes information corresponding to the one or more patch dependencies.

18. An integrity tracking tool for network elements using blockchains, the integrity tracking tool comprising:

a processor and memory of a blockchain network, the processor configured to execute instructions stored in the memory to:

receive, by a full node client, a patch request from a patch initiator, the patch request including first hashed information indicative of an expected result of a patch;

validate, by the full node client, the patch request;

write, onto a blockchain, the patch request;

transmit, by the full node client, the patch request to a network element;

receive, by the full node client, a patch report from the network element, the patch report including second hashed information indicative of the expected result of the patch applied to the network element; and validate, by the full node client, the patch report in accordance with one or more operations, the one or more operations including confirming a match between the first hashed information and the second hashed information: and write the patch report onto the blockchain.

19. The integrity tracking tool of claim 18, wherein the processor is configured to: transmit, by the full node client, a previous status of a first instance of a software to be patched in the network element to an audit system.

20. The integrity tracking tool of claim 19, wherein a patch is transmitted from a blockchain database and a lightweight client of the patch initiator to a lightweight agent of the first instance of the software to be patched in the network element.

21. The integrity tracking tool of claim 20, wherein the lightweight agent of first instance of the network element compares the patch request from the processor of the blockchain network to the patch from the blockchain database and lightweight client of the patch initiator.

22. The integrity tracking tool of claim 21, wherein a second instance of the of the software to be patched in the network element is created when the patch request from the processor of the blockchain network matches the patch from the blockchain database and lightweight client of the patch initiator.

23. The integrity tracking tool of claim 22, wherein the second instance of the network element applies the patch and generates the patch report.

24. The integrity tracking tool of claim 23, wherein the second instance of the network element reports to the lightweight agent of the first instance of the network element that the patch is safe.

25. The integrity tracking tool of claim 24, wherein the second instance of network element is deleted and the patch is applied to the lightweight agent of the first instance of the network element.

26. The integrity tracking tool of claim 25, wherein the audit system compares the previous status of the network element to a local current status of the network element.

27. The integrity tracking tool of claim 26, wherein a warning is transmitted to the lightweight client of the patch initiator when the local current status of the network element does not match the previous status of the network element.

28. The integrity tracking tool of claim 18, wherein the first hashed information in the patch request is indicative of the expected result of the patch and one or more patch dependencies and wherein the second hashed information is indicative of the expected result of the patch and the one or more patch dependencies.

29. The integrity tracking tool of claim 28, wherein the one or more patch dependencies include one or more prior patches installed in the network element, the blockchain including at least one block storing information indicative of the one or more prior patches.

\* \* \* \* \*